US012707220B2

(12) United States Patent
Campbell et al.

(10) Patent No.: US 12,707,220 B2
(45) Date of Patent: Aug. 11, 2026

(54) AUDIO EQUALIZATION METADATA

(71) Applicant: NURA HOLDINGS PTY LTD, Brunswick (AU)

(72) Inventors: Luke John Campbell, Brunswick (AU); Dragan Petrovic, Union City, CA (US)

(73) Assignee: Nura Holdings Pty Ltd, Brunswick (AU)

( * ) Notice: Subject to any disclaimer, the term of this patent is extended or adjusted under 35 U.S.C. 154(b) by 130 days.

(21) Appl. No.: 17/414,925

(22) PCT Filed: Dec. 20, 2019

(86) PCT No.: PCT/US2019/067790
§ 371 (c)(1),
(2) Date: Jun. 16, 2021

(87) PCT Pub. No.: WO2020/132412
PCT Pub. Date: Jun. 25, 2020

(65) Prior Publication Data

US 2022/0070604 A1 Mar. 3, 2022

Related U.S. Application Data

(60) Provisional application No. 62/784,176, filed on Dec. 21, 2018.

(51) Int. Cl.
*H04S 7/00* (2006.01)
*H04R 29/00* (2006.01)

(52) U.S. Cl.
CPC ............. *H04S 7/301* (2013.01); *H04R 29/00* (2013.01)

(58) Field of Classification Search
CPC ................................ H04S 7/301; H04R 29/00
See application file for complete search history.

(56) References Cited

U.S. PATENT DOCUMENTS 5,776,179 A 7/1998 Ren et al.
6,104,819 A 8/2000 Nickum
(Continued)

FOREIGN PATENT DOCUMENTS

CN 104 545 940 4/2015
CN 109 068 205 12/2018
(Continued)

OTHER PUBLICATIONS

International Search Report and Written Opinion mailed on Mar. 11, 2020 for International Application No. PCT/US2019/067790, filed on Dec. 20, 2019 (14 pages).
(Continued)

*Primary Examiner* — Daniel R Sellers
(74) *Attorney, Agent, or Firm* — Knobbe, Martens, Olson & Bear, LLP

(57) ABSTRACT

Introduced here are systems and methods to enable recording artists and engineers to specify exactly how the audio track should be played as well as perceived by the user in the case where the frequency transfer functions of the sound playback system and/or listening mechanisms (user's own hearing) can be measured and compensated for. For example, the acoustic environment during recording and mastering can be measured, and the measurements can be recorded in an inaudible portion of an audio track. The acoustic environment can include speaker frequency, distortion, reverberation, channel separation, room acoustics, etc. In addition, a hearing profile of the audio creator, such as the recording artist, sound engineer, mastering person, etc., can be included within the inaudible data. Further, the acoustic environment and/or the hearing profile of the audio consumer can also be used to modify the audio prior to reproducing the audio to the audio consumer.

16 Claims, 11 Drawing Sheets

(56) References Cited

U.S. PATENT DOCUMENTS

| | | | | |
|---|---|---|---|---|
| 7,399,282 | B2 | 7/2008 | John et al. | |
| 7,529,370 | B1 | 5/2009 | Zhang et al. | |
| 7,587,052 | B2 | 9/2009 | Kasztelan | |
| 8,213,649 | B2 | 7/2012 | Goldstein et al. | |
| 8,277,390 | B2 | 10/2012 | Jennsen et al. | |
| 8,611,552 | B1 * | 12/2013 | Murgia | H04R 1/1083 381/71.8 |
| 8,682,010 | B2 | 3/2014 | Macours | |
| 8,688,036 | B2 | 4/2014 | Parkins et al. | |
| 8,693,720 | B2 | 4/2014 | Parkins | |
| 8,840,565 | B2 | 9/2014 | Keefe | |
| 9,083,388 | B2 | 7/2015 | Parkins | |
| 9,137,609 | B2 | 9/2015 | Bruss et al. | |
| 9,173,045 | B2 | 10/2015 | Bruss et al. | |
| 9,210,498 | B1 | 12/2015 | Shaffer | |
| 9,313,577 | B2 | 4/2016 | Bodvarsson et al. | |
| 9,332,364 | B2 | 5/2016 | Goldstein | |
| 9,351,064 | B2 | 5/2016 | Parkins | |
| 9,401,158 | B1 | 7/2016 | Yen et al. | |
| 9,497,530 | B1 | 11/2016 | Campbell et al. | |
| 9,516,404 | B2 | 12/2016 | Parkins | |
| 9,525,930 | B2 | 12/2016 | Parkins | |
| 9,654,876 | B2 | 5/2017 | Neely | |
| 9,748,914 | B2 | 8/2017 | Antonellis et al. | |
| 9,774,946 | B2 | 9/2017 | Parkins | |
| 9,794,672 | B2 | 10/2017 | Campbell et al. | |
| 9,877,117 | B2 | 1/2018 | Sabin | |
| 9,894,441 | B2 | 2/2018 | Bang et al. | |
| 9,924,261 | B2 | 3/2018 | Parkins | |
| 9,949,048 | B2 | 4/2018 | Isberg et al. | |
| 10,051,460 | B2 | 8/2018 | Bran | |
| 10,154,333 | B2 | 12/2018 | Campbell et al. | |
| 10,165,345 | B2 | 12/2018 | Slater et al. | |
| 10,292,626 | B2 | 5/2019 | Coninx | |
| 10,357,403 | B2 | 7/2019 | Parkins | |
| 10,448,143 | B2 | 10/2019 | Parkins | |
| 10,448,144 | B2 | 10/2019 | Parkins | |
| 10,536,763 | B2 | 1/2020 | Slater et al. | |
| 10,561,347 | B2 | 2/2020 | Dalhoff et al. | |
| 10,621,973 | B1 | 4/2020 | McVicker et al. | |
| 10,679,621 | B1 | 6/2020 | Sundaram et al. | |
| 10,708,680 | B2 | 7/2020 | Campbell et al. | |
| 10,979,836 | B2 | 4/2021 | Usher et al. | |
| 11,006,225 | B2 | 5/2021 | Greenberg et al. | |
| 11,024,421 | B2 | 6/2021 | Dalhoff et al. | |
| 11,144,646 | B2 | 10/2021 | Maretti et al. | |
| 11,202,159 | B2 | 12/2021 | Boley et al. | |
| 11,910,145 | B2 | 2/2024 | Campbell et al. | |
| 11,995,201 | B2 | 5/2024 | Campbell et al. | |
| 12,106,752 | B2 | 10/2024 | Campbell et al. | |
| 12,200,421 | B2 | 1/2025 | Campbell et al. | |
| 2005/0090372 | A1 | 4/2005 | Burrows et al. | |
| 2005/0251273 | A1 * | 11/2005 | Bychowsky | H04H 60/13 381/56 |
| 2006/0045294 | A1 * | 3/2006 | Smyth | H04S 7/304 381/74 |
| 2006/0153396 | A1 | 7/2006 | John | |
| 2007/0155313 | A1 | 7/2007 | Goldberg et al. | |
| 2007/0270988 | A1 | 11/2007 | Goldstein et al. | |
| 2008/0205660 | A1 | 8/2008 | Goldstein | |
| 2008/0219486 | A1 | 9/2008 | Goldstein et al. | |
| 2008/0260169 | A1 | 10/2008 | Reuss | |
| 2008/0285780 | A1 | 11/2008 | Aarts | |
| 2008/0318518 | A1 | 12/2008 | Coutinho et al. | |
| 2010/0119093 | A1 | 5/2010 | Uzuanis et al. | |
| 2011/0206217 | A1 | 8/2011 | Weis | |
| 2011/0268281 | A1 | 11/2011 | Florencio et al. | |
| 2012/0051548 | A1 | 3/2012 | Visser et al. | |
| 2012/0095749 | A1 | 4/2012 | Capretta | |
| 2012/0159617 | A1 | 6/2012 | Wu et al. | |
| 2012/0183165 | A1 | 7/2012 | Foo | |
| 2012/0282976 | A1 | 11/2012 | Suhami | |
| 2013/0028437 | A1 | 1/2013 | Bruss et al. | |
| 2013/0191115 | A1 | 7/2013 | Suzuki et al. | |
| 2013/0216052 | A1 | 8/2013 | Bruss et al. | |
| 2013/0246059 | A1 | 9/2013 | Kechichian et al. | |
| 2014/0031426 | A1 | 1/2014 | Destaillats et al. | |
| 2014/0044269 | A1 | 2/2014 | Anderson | |
| 2014/0044281 | A1 | 2/2014 | Ganem | |
| 2014/0044293 | A1 | 2/2014 | Ganem | |
| 2014/0050334 | A1 * | 2/2014 | Antonellis | H03G 5/165 381/98 |
| 2014/0162556 | A1 | 6/2014 | Dua | |
| 2014/0247952 | A1 | 9/2014 | Goldstein | |
| 2014/0314261 | A1 | 10/2014 | Selig et al. | |
| 2015/0073794 | A1 | 3/2015 | Kalinli-Akbacak et al. | |
| 2015/0162767 | A1 | 6/2015 | Oh et al. | |
| 2015/0179178 | A1 | 6/2015 | Usher et al. | |
| 2015/0257683 | A1 | 9/2015 | Ashmore et al. | |
| 2015/0281853 | A1 | 10/2015 | Eisner et al. | |
| 2015/0334484 | A1 | 11/2015 | Usher et al. | |
| 2016/0014492 | A1 | 1/2016 | McCarthy et al. | |
| 2016/0076858 | A1 | 3/2016 | Howes | |
| 2016/0267899 | A1 | 9/2016 | Gauger, Jr. et al. | |
| 2017/0032801 | A1 | 2/2017 | Baumgarte | |
| 2017/0064429 | A1 | 3/2017 | Hirsch | |
| 2017/0064434 | A1 * | 3/2017 | Campbell | H04R 1/1091 |
| 2017/0116995 | A1 | 4/2017 | Ady et al. | |
| 2017/0127196 | A1 | 5/2017 | Blum | |
| 2017/0178631 | A1 | 6/2017 | Boesen | |
| 2017/0195806 | A1 | 7/2017 | Atamaniu | |
| 2017/0231345 | A1 | 8/2017 | Gronewoller | |
| 2017/0332186 | A1 | 11/2017 | Riggs et al. | |
| 2018/0083468 | A1 | 3/2018 | Dennis | |
| 2018/0124527 | A1 | 5/2018 | El-Hoiydi et al. | |
| 2018/0336918 | A1 | 11/2018 | Zadgaonkar et al. | |
| 2018/0367882 | A1 | 12/2018 | Watts et al. | |
| 2018/0376235 | A1 | 12/2018 | Leabman et al. | |
| 2019/0075383 | A1 | 3/2019 | Slater et al. | |
| 2019/0076058 | A1 | 3/2019 | Piechowiak et al. | |
| 2019/0110929 | A1 | 4/2019 | Persson | |
| 2019/0159702 | A1 | 5/2019 | Charaziak et al. | |
| 2019/0261089 | A1 | 8/2019 | Hariharan et al. | |
| 2019/0325887 | A1 | 10/2019 | Karkkainen et al. | |
| 2020/0184996 | A1 | 6/2020 | Steele et al. | |
| 2020/0196977 | A1 | 6/2020 | Martin et al. | |
| 2020/0268288 | A1 | 8/2020 | Dalhoff et al. | |
| 2020/0296500 | A1 | 9/2020 | Wang | |
| 2020/0374646 | A1 * | 11/2020 | Lee | G10L 19/008 |
| 2024/0276134 | A1 | 8/2024 | Campbell et al. | |
| 2025/0061894 | A1 | 2/2025 | Campbell et al. | |

FOREIGN PATENT DOCUMENTS

| | | | |
|---|---|---|---|
| EP | 2 009 620 | | 11/2012 |
| EP | 2 202 998 | | 2/2014 |
| JP | 2014-154956 | | 8/2014 |
| WO | 2001024576 | A1 | 4/2001 |
| WO | WO 2007/131815 | | 11/2007 |
| WO | WO 2008/087614 | | 7/2008 |
| WO | WO 2008/116462 | | 10/2008 |
| WO | WO 2011/146903 | | 11/2011 |
| WO | WO 2014/079549 | | 5/2014 |
| WO | WO 2017/040327 | | 3/2017 |
| WO | WO 2018/087570 | | 5/2018 |
| WO | WO 2018/146609 | | 8/2018 |
| WO | WO 2020/131963 | | 6/2020 |
| WO | WO 2020/132576 | | 6/2020 |
| WO | WO 2020/180499 | | 9/2020 |

OTHER PUBLICATIONS

U.S. Appl. No. 61/224,531, filed Jul. 10, 2009, Parkins.

* cited by examiner

AUDIO EQUALIZATION METADATA

CROSS-REFERENCE TO RELATED APPLICATION

The present application is a U.S. National Phase Entry of International PCT Application No. PCT/US2019/067790 filed on Dec. 20, 2019, and entitled "Audio Equalization Metadata," which claims priority to the U.S. provisional patent application Ser. No. 62/784,176 filed on Dec. 21, 2018, titled "Audio Equalization Metadata," which is incorporated herein by reference in its entirety.

TECHNICAL FIELD

The present invention relates generally to recording and reproducing sound, and in particular to providing information regarding the acoustic environment through which sound propagates and a hearing profile of a user.

BACKGROUND

Recorded audio such as music is played on a variety of sound playback systems—these include a variety of different headphones, car stereos, home audio systems, etc. The many different sound systems have different frequency responses which cause the same recorded audio track to sound different depending on which sound system it is being played through. As a result, audio tracks such as music are often engineered to sound acceptable on a wide variety of sound playback systems rather than for best sound on any particular sound playback system.

Further complicating matters is the fact that all users hear differently because each person's ears are unique (this includes the outer ear, middle ear and inner ear—each of which is unique in each individual). Consequently, an audio that sounds good to a recording engineer, does not sound the same to a user, and consumers of music are precluded from hearing the sound quality that an artist, creator, or recording engineer has intended for the user to hear.

SUMMARY

Introduced here are systems and methods to enable recording artists, creators, and engineers to specify exactly how the audio track should be played as well as perceived by the user in the case where the frequency transfer functions of the sound playback system and/or listening mechanisms (user's own hearing) can be measured and compensated for. For example, the acoustic environment during recording and mastering can be measured, and the measurements can be recorded in an inaudible portion of an audio track. The acoustic environment can include speaker frequency, distortion, reverberation, channel separation, room acoustics, etc. In addition, a hearing profile of the audio creator, such as the recording artist, sound engineer, mastering person, etc., can be included within the inaudible data. Further, the acoustic environment and/or the hearing profile of the audio consumer can also be used to modify the audio prior to reproducing the audio to the audio consumer. In such a way, the quality of the studio recording can be re-created for the audio consumer.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

Terminology

Figure 1:
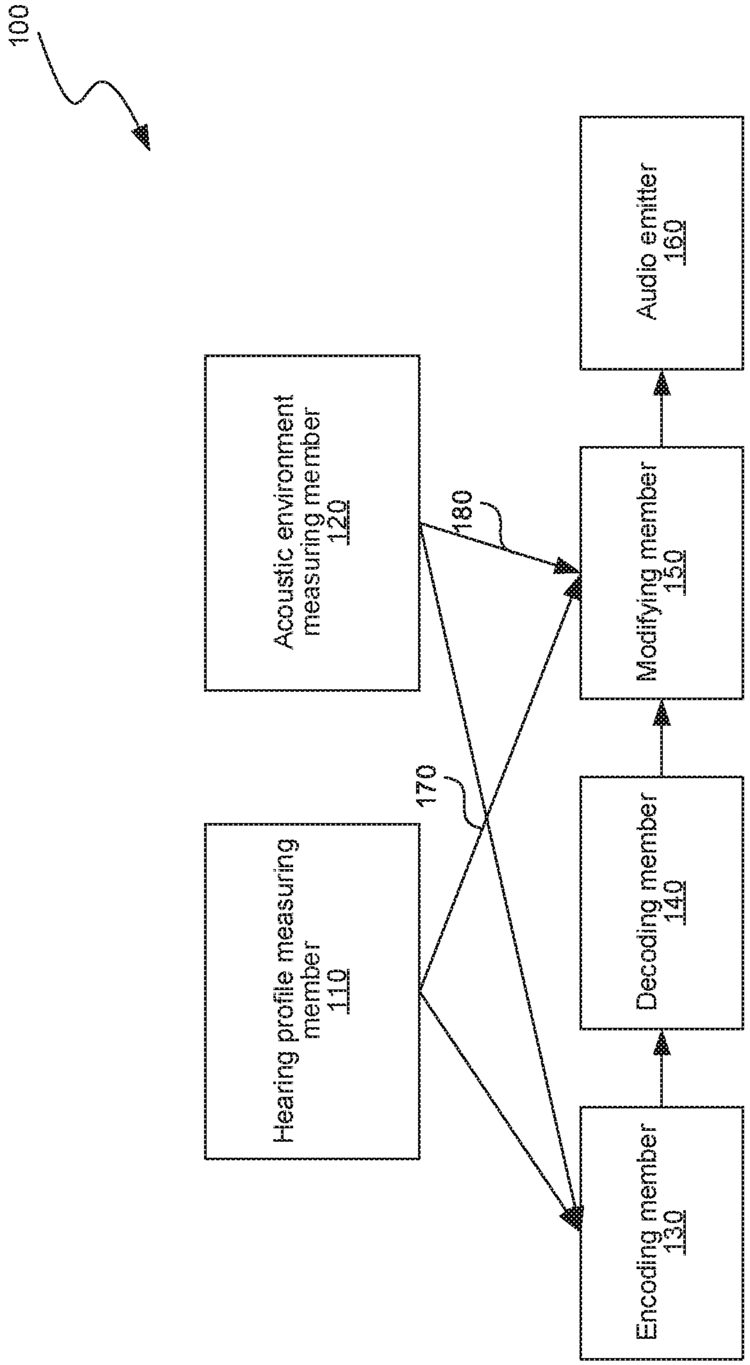
FIG. 1 shows a system to provide an audio consumer with the sound quality comparable to the studio sound quality.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way. In Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Audio Equalization Metadata

FIG. 1 shows a system to provide an audio consumer with the sound quality comparable to the studio sound quality. The system 100 can include a hearing profile measuring member 110, an acoustic environment measuring member 120, encoding member 130, a decoding member 140, modifying member 150, and/or an audio emitter 160. The system 100 can include any one or more of the members 110-160, arranged in any combination.

The hearing profile measuring member 110 can include an earbud, a microphone, a capacitor, a dry electrode, a wet electrode, to measure a user's response to an audio signal. The hearing profile measuring member 110 can be placed in proximity to the user's ear canal, to emit an audio signal, and to measure a response to the audio signal associated with the user. The user can be an audio consumer or an audio creator.

The hearing profile measuring member 110 can measure the hearing profile of the user automatically using objective measurement, without a subjective test of hearing, i.e. without requiring the user to indicate whether the user heard the sound or not and/or how loud was the sound. The hearing profile can correlate a perceived amplitude and a perceived frequency and a received amplitude and a received frequency. For example, the user's ear can receive a frequency of 5 kHz at 20 dB, but the user's ear can perceive that frequency as 5 kHz at 10 dB.

For example, an audio emitter such as the speaker can emit an audio signal, and the hearing profile measuring member 110 can measure the response of the user to the audio signal. The measured response can be an otoacoustic emission (OAE), an auditory evoked potential (AEP), and acoustic reflex, etc. OAE is a low-level sound emitted by the cochlea either spontaneously or evoked by an auditory stimulus. AEP is a type of EEG signal emanated from the brain through the scalp in response an acoustical stimulus. System 100 can measure any AEP, such as auditory brainstem response, mid latency response, cortical response, acoustic change complex, auditory steady state response, complex auditory brainstem response, electrocochleography, cochlear microphonic, or cochlear neurophonic AEP. The acoustic reflex (also known as the stapedius reflex, middle-ear-muscles (MEM) reflex, attenuation reflex, or auditory reflex) is an involuntary muscle contraction that occurs in the middle ear in response to high-intensity sound stimuli or when the person starts to vocalize.

The acoustic environment measuring member 120 can measure an acoustic environment configured to surround the user and can record a measurement of the acoustic environment. The acoustic environment can include an acoustic profile of a speaker such as speaker frequency, speaker distortion, speaker reverberation, channel separation, and/or room acoustics. The acoustic environment measuring member 120 can measure the acoustic environment surrounding the audio creator, or the audio consumer. The acoustic environment can be measured every time before an audio creator works on creating the song or can be measured every time the acoustic environment of the room changes such as moving the audio emitters, or the location of the audio creator by at least half a meter.

For example, the acoustic environment measuring member 120 can include at least a microphone placed proximate to each ear of the user and one or more audio emitters, such as a speaker. When the audio emitter produces a sound, the microphones near the user's ears can record an impulse response at the user's ears. An impulse response can include a frequency and an amplitude of the sound as a function of time.

In another example, the acoustic environment measuring member 120 can measure a location configured to accommodate the user in relation to a location of an audio emitter. For example, the acoustic environment measuring member 120 can be a range finder. The range finder can include one or any combination of a laser, radar, sonar, lidar, sub-sonic range finder, and/or ultrasonic range finder.

The encoding member 130 can encode the hearing profile of the user measured by the hearing profile measuring member 110 and the measurement of the acoustic environment measured by the acoustic environment measuring member 120 into an inaudible data associated with an audible data. The encoding member 130 can be a processor. The audible data can be represented as a part of a sound recording, video recording, can be a streaming sound such as a podcast, a streaming video, a three-dimensional representation of the environment, etc. The inaudible data can be a metadata associated with the audible data, and can be included as part of the audio file, video file, the streaming format, etc. The inaudible data can be embedded in the audible data, so that the user cannot hear the audible data.

The decoding member 140 can receive the encoded data and can decode the inaudible data. The decoding member 140 can be part of the modifying member 150. The modifying member 150 can a be a processor, and/or a microcontroller. The decoding member 140, the modifying member 150 and the encoding member 130 can include one or more processors. The modifying member 150 can receive the decoded inaudible data and can modify the audible data based on the hearing profile decoded from the inaudible data and the acoustic environment decoded from the inaudible data prior to playing the modified audible data to an audio consumer. The modifying member 150 can also receive the data about the acoustic environment and the hearing profile of the user through channels 170, 180 independent of the decoding member. For example, the modifying member 150 can receive the hearing profile data and the acoustic environment data directly from the hearing profile measuring member 110 and the acoustic environment measuring member 120. For example, when the user is an audio consumer, the hearing profile of the audio consumer and the acoustic environment of the audio consumer can be communicated to the modifying member 150 without the encoding member 130 encoding the hearing profile and the acoustic environment. By modifying the audible data, the modifying member 150 can re-create the acoustic environment that existed at the time of the creation of the audible data. For example, the modifying member 150 can re-create the studio sound quality to the user, listening to an audio track at his home theater or using headphones.

The audio emitter 160 can be one or any combination of a speaker such as a home theater speaker, a headphone, an earbud, and airport, etc. The audio emitter 160 can receive the modified sound from the modifying member 150. In one embodiment, the modifying member 150 can also obtain an acoustic profile of the audio emitter 160 and the modifying member 150 can compensate for the acoustic profile of the audio emitter 160. For example, the acoustic profile of the audio emitter 160 can indicate that the audio emitter 160 tends to play a particular frequency at 80% of the intended aptitude. Consequently, the modifying member 150 can increase the amplitude of the particular frequency by 125% so that the reproduced amplitude matches the intended amplitude of the particular frequency.

Figure 2A:
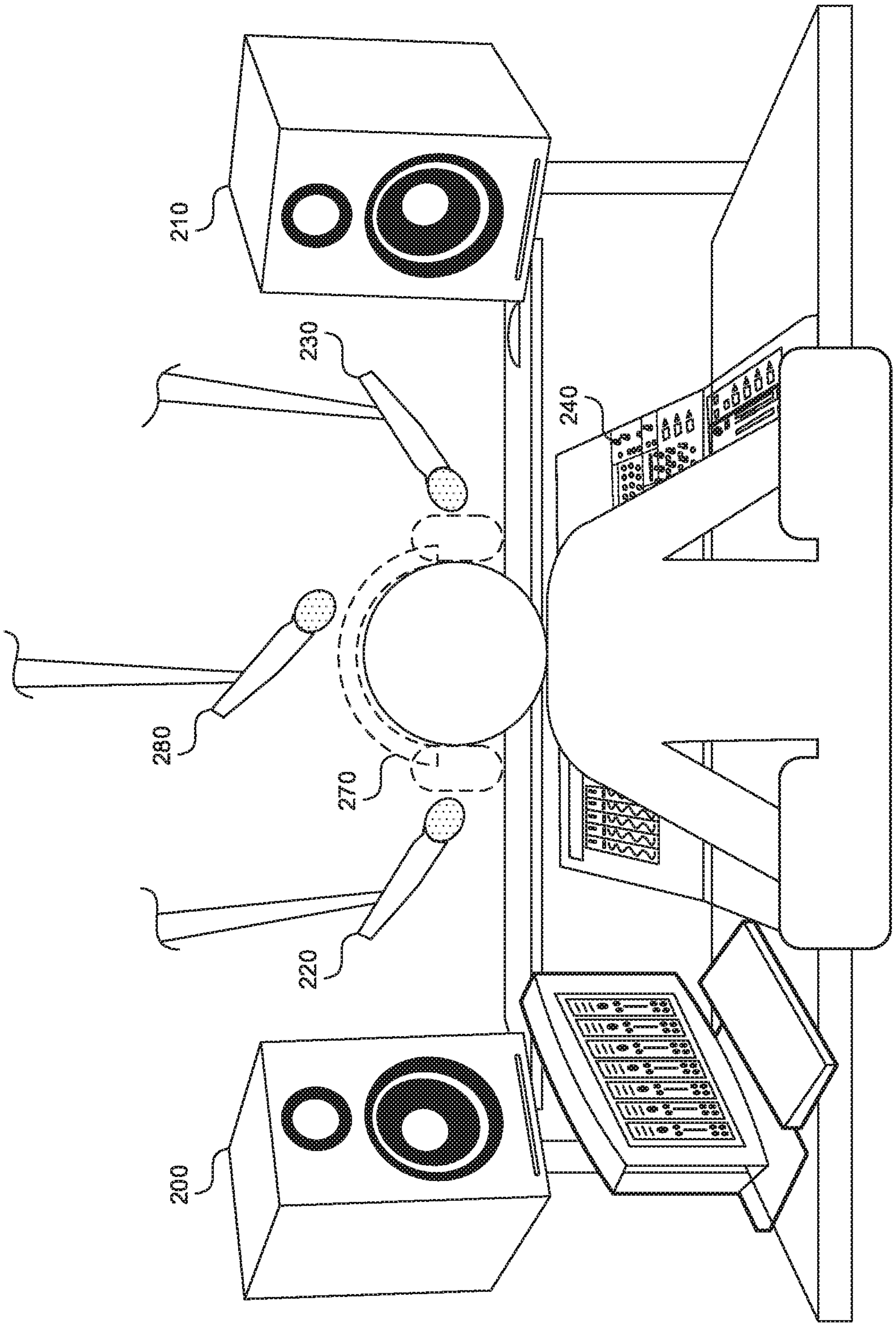
FIG. 2A shows an acoustic environment measuring member, according to one embodiment.

FIG. 2A shows an acoustic environment measuring member, according to one embodiment. The acoustic environment can include a number and location of the speakers 200, 210, 270 in relation to the audio creator, the acoustics of the room in which the speakers 200, 210 are positioned, the acoustic profile of the speakers 200, 210, etc. The speakers can be standalone speakers 200, 210 and/or headphone speakers 270. The acoustic profile of the speakers can include speaker frequency profile (e.g. whether the speaker is a subwoofer or a tweeter), distortion, reverberation, channel separation, etc.

The audio creator can listen to the sound emitted by the speakers 200, 210, 270, and can equalize the sound using an equalizer 240. The equalizer 240 can be an equalizing software. The audio creator can be an artist, sound engineer, a mastering person, or anyone creating an audio file. The equalizer 240 settings, such as amplitudes and their corresponding frequencies can also be recorded within inaudible data. The recorded equalizer settings can be used in modifying the audio prior to playing the audio to the audio consumer.

The microphones 220, 230 can be positioned in proximity to the audio creator's ears, such as several centimeters away from the audio creator's ears. The microphones 220, 230 can measure the impulse response of the sound emitted by the speakers 200, 210. The audio captured by the microphones 220, 230 can measure the acoustic environment because the sound reaching the audio creator depends on the relative positioning of the speakers 200, 210 and the audio creator, and can include the sound emitted by the speakers 200, 210, and the sound bouncing off the walls of the room. The audio captured by the microphones 220, 230 can capture the distortion of the speakers, the reverberation in the room, and how the room is modifying the frequency response to the speakers. Instead of or in addition to the microphones 220, 230 positioned at the audio creator's ears, a microphone 280 can be positioned close to the audio creator's head.

For example, the sound emitted by the speaker 200 reaches the microphone 220 before reaching the microphone 230 because the speaker 200 is closer to the microphone 220 than to the microphone 230. Consequently, the audio creator's right ear receives the sound emitted by the speaker 200 with a slight delay as compared to the audio creator's left ear. To ensure that the audio consumer listening to the audio recorded by the audio creator hears the same delay, the acoustic environment of the recording studio as well as the acoustic environment in which the audio consumer listens to the audio needs to be accounted for.

In another example, the speakers 200, 210, 270 can create a stereophonic and/or surround sound experience for the audio creator. In a more specific example, the audio creator can have an impression that a sound is moving from the left speaker 200 to the right speaker 210. The impression can be created by adjusting the delay of the same sound emitted by the left speaker 200 and the right speaker 210. Initially, the sound is emitted by the left speaker 200 at a time T1, and the sound is emitted by the right speaker 210 at a time T1' which is later than time T1. To create the impression that the sound is moving from left to right, the left speaker 200 emits the sound at a time T2 and the right speaker 210 emits the sound of the time T2' which is later than time T2, however T2'-T2 is less than T1'-T1. The difference between T' and T continually reduces to create the impression of the sound is moving from left to right. To create an impression that the sound is at the center of the room, the speaker 200 and the speaker 210 emit the sound at the same time. To create an impression that the sound has arrived at the right speaker 210, the left speaker 200 emits the sound of time TK and the right speaker 210 emits the sound at a time TK' which is before time TK. TK-TK' can be equal to T1'-T1. To ensure that the audio consumer listening to the audio recorded by the audio creator hears the same effect of the sound going from left to right, the acoustic environment of the recording studio as well as the acoustic environment in which the audio consumer listens to the audio needs to be accounted for.

Figure 2B:
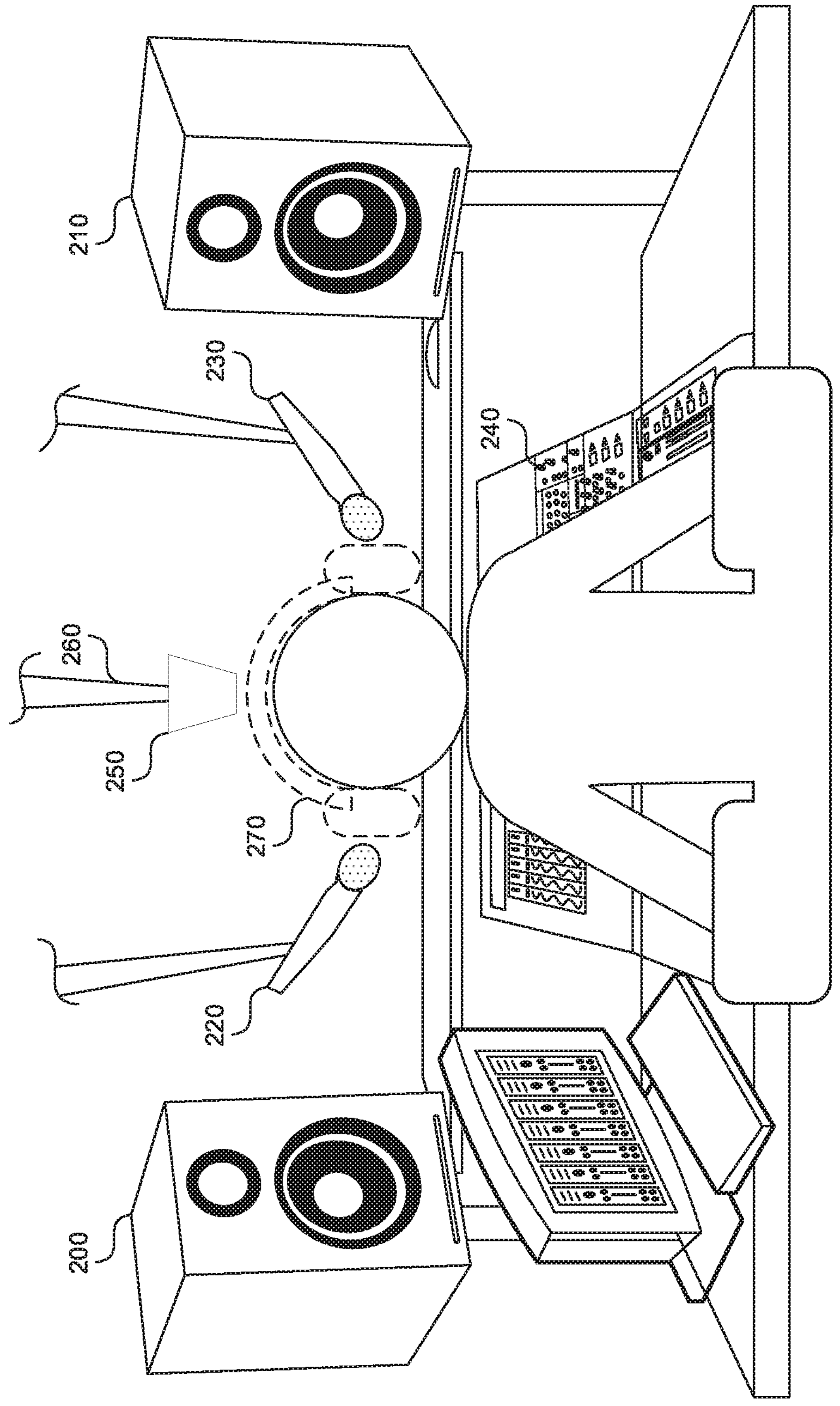
FIG. 2B shows an acoustic environment measuring member, according to another embodiment.

FIG. 2B shows an acoustic environment measuring member, according to another embodiment. As explained above, the acoustic environment can include a number and location of the speakers 200, 210, 270 in relation to the audio creator, and an acoustic profile of the speakers 200, 210, 270. The speakers can be standalone speakers 200, 210 and/or headphone speakers 270. To measure the location of the speakers 200, 210, 270 in relation to the audio creator, one or more range finders 250 can be placed proximate to a location of where audio creator's ears are expected to be. The range finder 250 can be placed in addition to the microphones 220, 230, or instead of the microphones 220, 230. The range finder 250 can be placed within one meter of the expected location of the audio creator's ears. The range finder 250 can be suspended from the ceiling as shown in FIG. 2B or can be placed on a flat surface close to the audio creator. The range finder 250 can be mounted on an adjustable length rod 260, so that when the audio creator assumes the working position, the audio creator can adjust the length of the rod 260 to be close to the audio creator's head.

The range finder can include one or any combination of a laser, radar, sonar, lidar, sub sonic range finder, and/or ultrasonic range finder. The range finder 250 can measure the relative locations of the speakers 200, 210, 270, and the range finder, and record the relative locations in the inaudible data.

As explained above, to re-create the sound quality heard by the audio creator to an audio consumer, the relative locations of the speakers with respect to the audio creator are recorded along with an audible data. For example, the sound emitted by the speaker 200 reaches the microphone 220 before reaching the microphone 230 because the speaker 200 is closer to the microphone 220 and to the microphone 230. Consequently, the audio creator's right ear receives the sound emitted by the speaker 200 with a slight delay as compared to the audio creator's left ear. To ensure that the audio consumer listening to the audio recorded by the audio creator hears the same delay, the acoustic environment of the recording studio as well as the acoustic environment in which the audio consumer listens to the audio needs to be accounted for. If the audio creator has recorded the sound listening to speakers, while the audio consumer is listening to the sound using headphones, a sound emitted by the left speaker to the audio creator needs to be also emitted by the right speaker for the audio consumer, with a slight delay compared to the sound emitted by left speaker of the headphones, so that both ears of the audio consumer perceive the sound.

Figure 3:
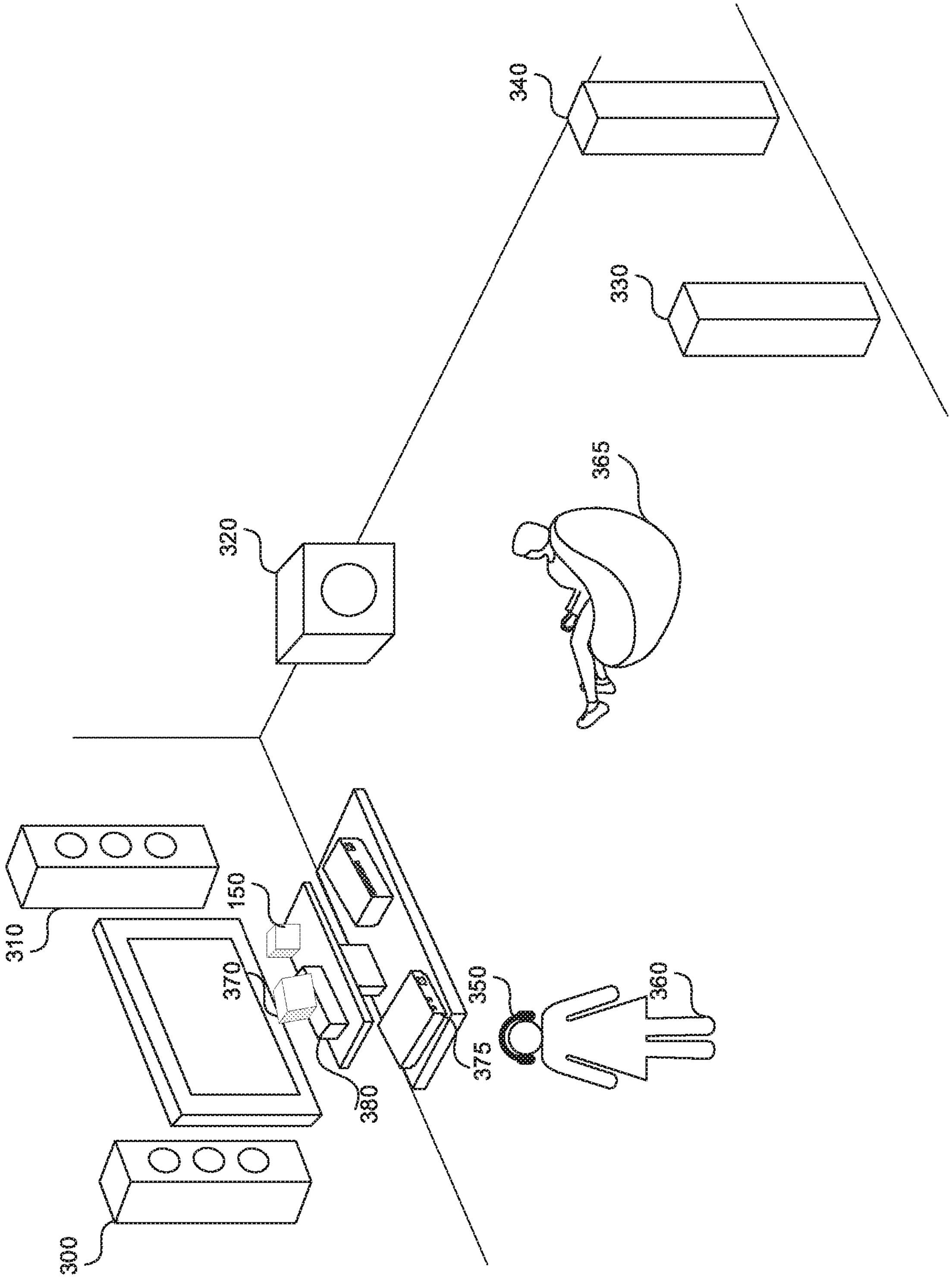
FIG. 3 shows an acoustic environment surrounding an audio consumer.

FIG. 3 shows an acoustic environment surrounding an audio consumer. The acoustic environment includes a number and a location of speakers 300, 310, 320, 330, 340, 350 a location 360, 365 of the audio consumer, the acoustic profile of the speakers 300-350, etc. A modifying member 150 can take into account the acoustic environment surrounding the audio creator, the acoustic environment surrounding the audio consumer, the hearing profile of the audio creator and/or the hearing profile of the audio consumer to re-create the sound quality heard by the audio creator to the audio consumer. The modifying member 150 can be standalone, can plug into another device such as the speakers 300-350, amplifier 375, home device 380, etc., or can be a part of one of the speakers 300-350, the amplifier 375, the home device 380, etc. If the acoustic environment surrounding the audio creator and the acoustic environment surrounding the audio consumer is the same, the modifying member 150 needs to count only for the hearing profile differences between the audio creator and the audio consumer.

The number and location of the speakers 300-350 can be determined by a range finder 370 installed separately or installed within one of the speakers 300-350. The speakers 300-350 can be standalone speakers, or can be part of a headphone, an earbud, a hearing aid, etc. The range finder 370 can also be a part of the home device 380 which can also aid in determining the number and location of the speakers 300-350. For example, the home device can have a list of all the devices installed within the home, including the speakers 300-350.

The location 360, 365 of the audio consumer can be determined in various ways. For example, the range finder 370 can be used to determine the location of the audio consumer. The home device 380 can locate the audio consumer using a camera or a microphone associated with the home device 380 recording the audio consumer. Based on the video and/or audio recordings, the home device can locate the audio consumer. The home device 380 can also determine the location of a mobile device associated with the audio consumer by wirelessly communicating with the mobile device. The mobile device can be a cell phone, a headphone, an earbud, etc.

The acoustic profile of the speakers 300-350 can include speaker frequency profile (e.g. whether the speaker is a subwoofer or a tweeter), distortion, reverberation, channel separation, etc.

To re-create a delay heard by the audio creator in FIGS. 2A-2B, when, for example, the left speaker 200 in FIGS. 2A-2B emits a sound, the modifying member 150 can determine, based on the distance, D1, between the left speaker 200 and the audio creator in FIGS. 2A-2B, a delay, dT, between the sound reaching the audio creator's left ear and the audio creator's right ear. The distance D1 can be recorded in the inaudible data as part of the acoustic environment surrounding the audio creator. To re-create the same delay, the modifying member 150 can obtain distances, D2-DK between the audio consumer and each of the speakers 300-350. The modifying member 150 can determine if the distance D1 is within half a meter of any of the distances D2-DK, and if such a distance, DF, is found, the speaker corresponding to the distance DF can emit the sound emitted by the left speaker 200. If no such speaker is found, two or more of the speakers 300-350 can emit multiple interfering sounds so that the audio consumer perceives the desired time delay dT between the left ear and the right ear.

For example, to create the multiple interfering sounds, akin to active noise cancellation, the right speaker 310 can emit an interfering sound to cancel out the sound emitted by the left speaker 300 for duration time, and after the desired delay, dT, can emit the same sound as the left speaker 300, so that the consumer hears the sound with his right ear after the desired delay, dT. The amplitude of the sound can be adjusted by both speakers 300, 310 so that the audio consumer hears the sound at a desired amplitude. Any of the speakers 300-350 can be used in creating the sound and/or the interfering sound.

In another example, to re-create a stereophonic and/or surround sound experience for the audio creator, as explained in reference to FIG. 2A above, the modifying member 150 can adjust the timing of the sound played by the various speakers 300-350. For example, to create an impression that a sound is traveling from the left speaker 300 to the right speaker 310, the modifying member 150 can adjust the time difference between a time the left speaker 300 emits the sound and the time the right speaker 310 emits the sound. The adjustment can compensate for the difference between the relative distance between the speakers 300, 310 and the audio consumer, and the relative distance between the speakers 200, 210, 270 in FIG. 2A and the audio creator.

The modifying member 150 can adjust the amplitude of the sound played through a speaker 300-350 based on the profile of that speaker, as explained in relation to FIG. 1. For example, if the speaker is known to emit a higher amplitude sound than is recorded in the audible data, the modifying member 150 can reduce the amplitude of the sound prior to sending the sound to the speaker.

The modifying member 150 can re-create to the acoustic environment of the audio creator for audio consumers in the same location, as well as in multiple locations 360, 365. For example, all of the multiple audio consumers can wear headphones, and the modifying member 150 can adjust the sound played through the headphones for all the audio consumer simultaneously. In another example, the audio consumer in location 365 is not wearing headphones, while the audio consumer in location 360 is wearing headphones. The modifying member 150 can adjust the audio played through the headphones 350 and the audio played through the speakers 300-340 at the same time so that both audio consumers perceive the same sound as the audio creator.

The acoustic environment such as headphones 350 and/or the surround sound system including speakers 300-340 can each have an audio profile. For example, headphones 350 can have extra binaural information, the surround sound systems including speakers 300-340 can have spatial information about how the speakers 300-340 arranged, etc. The modifying member 150 can take the audio profile associated with the acoustic environment into account when modifying the audio prior to reproduction. The modifying member 150 can also continuously monitor the ambient noise surrounding the audio consumer and adjust the amplitude of the audio to mask the ambient noise. The modifying member 150 can also perform active noise cancellation based on the measured ambient noise. For example, the modifying member 150 can monitor the changing ambient noise during car or plane travel and increase the amplitude of the audio to mask the changing ambient noise.

Figure 4:
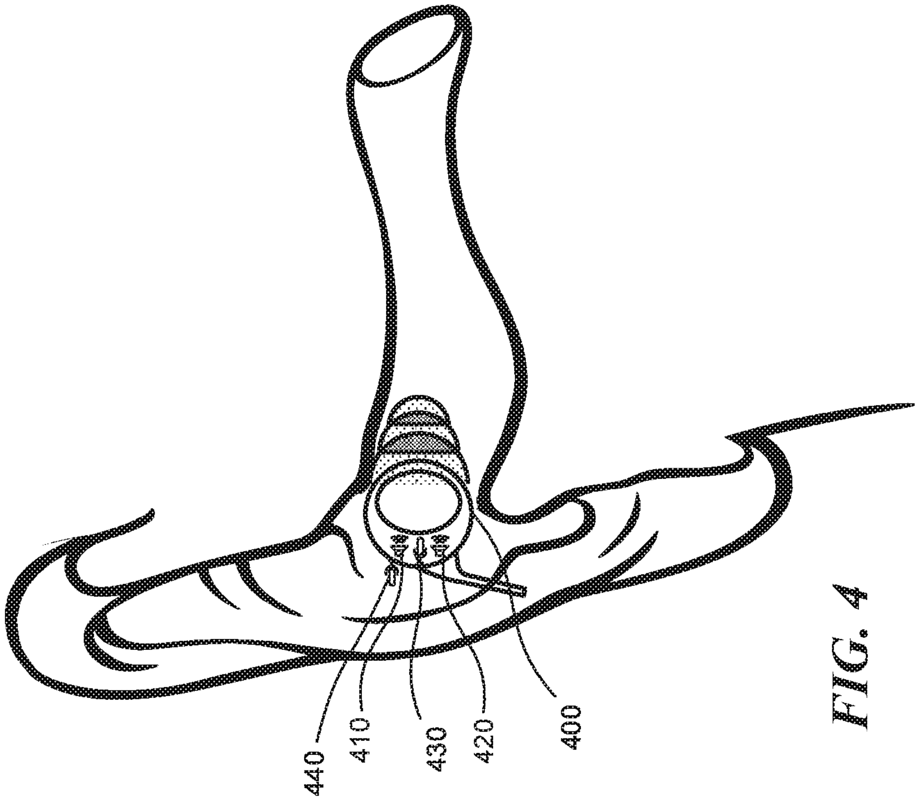
FIG. 4 shows a hearing profile measuring member, according to one embodiment.

FIG. 4 shows a hearing profile measuring member, according to one embodiment. The hearing profile measuring member 400 can be an earbud inserted into the user's ear. The earbud can be wired, wireless, can be standalone, can be part of a headphone, can be attached to an earcup, can be attached to a headband, etc. The earbud can include one or more speakers 410, 420, and one or more microphones 430, and an optional external microphone 440. The earbud can be placed at the entrance of the ear canal.

The speakers 410, 420 can emit a frequency in the audible range approximately between 20 Hz and 20 kHz. The microphone 430 can measure an OAE emitted by the cochlea. The OAE can indicate a how the user perceives the emitted frequency. The frequency can be emitted as a single frequency or can be emitted along with other frequencies.

OAE can be measured within the user's ear canal and then used to determine thresholds at multiple frequencies or relative amplitudes of the otoacoustic emissions at multiple frequencies to one or more suprathreshold sound levels in order to develop the frequency dependent hearing profile of the user's ear(s). Stimulus frequency OAE, swept-tone OAE, transient evoked OAE, distortion-product otoacoustic emission (DP-OAE), or pulsed DP-OAE can be used for this purpose.

The amplitude, latency, hearing threshold, and/or phase of the measured OAEs can be compared to response ranges from normal-hearing and hearing-impaired users to develop the frequency dependent hearing profile for each ear of the user.

Since DP-OAEs are best measured in a sealed ear canal with two separate speakers 410, 420 and two microphones 430 packed into each ear canal, the use of OAEs is best suited for the earbud implementation depicted in FIG. 4.

In the case of OAEs, one stimulus, frequency/amplitude, combination yields a response amplitude. The measurement of multiple frequencies in this manner yields a plot of response amplitude versus frequency, which can be stored in a memory of the hearing profile measuring member 400 or can be stored in a remote database. Many OAE techniques rely upon the measurement of one frequency per stimulus; however, the swept tone OAE measures all frequencies in the range of the sweep. Nevertheless, the hearing profile remains the same regardless of the measuring method used, that is, the hearing profile comprises a plot of the signal amplitude versus frequency of the OAE evoked in the user's ear upon application of an input audio signal. The hearing profile can also comprise the input amplitude associated with the input frequency.

In this exemplary embodiment, in order to determine the hearing profile for a user's ear, the hearing profile measuring member 400 can capture data points for an input audio signal including a number of frequencies, for example, 500, 1000, 2000 and 4000 Hz, which are typically the same frequencies used in the equalizer that acts upon the output sound signal to the loudspeakers 410, 420. At any one frequency, the hearing profile measuring member 400 can measure the response to an input audio signal at reducing levels, for example, at 70 dB, 60 dB, 50 dB, 40 dB, etc., until there is no longer a measurable response. The hearing profile measuring member 400 records the data point at that time. In other embodiments, different methods, such as curve fitting or measuring a profile at a single loudness level, can be used to determine the hearing profile. The input audio signal can include a test audio signal, and/or a content audio signal comprising music, speech, environment sounds, animal sounds, etc. For example, THE input audio signal can include the content audio signal with an embedded test audio signal.

In-situ calibration of the speakers 410, 420 to the user's ear canal can be performed by the hearing profile measuring member 400 prior to making an OAE measurement. In this context "in-situ" refers to measurements made at times when the speakers and microphone are situated for use inside the ear canal. Where the acoustic profile of the speakers 410, 420 are known, the acoustic impedance of the ear can be calculated from this data and utilized for deriving corrections.

In one or more embodiments, in-situ calibration can be done by playing a test audio signal, such as a chirp, or the content signal, covering the frequency range of the speakers, recording the frequency response with the microphone, and adjusting output by changing the equalizer settings to make a flat frequency response of the desired loudness.

In other embodiments, this calibration can be done in real time to any playback sound (e.g., music, or any audio comprising content) by constantly comparing the predicted output of the speakers 410, 420 in the frequency domain given the electric input to the speaker 410, 420 to the microphone 430 and altering the equalizer gains until they match. The in-situ calibration accounts for variations in different users' external portion of the ear and variations in the placement of earbuds. If no audiometric data is yet available, then the in-situ calibration alone can be used for adjusting the sound. Additional description can be found in U.S. Pat. No. 9,497,530 herein incorporated by reference in its entirety.

Figure 5:
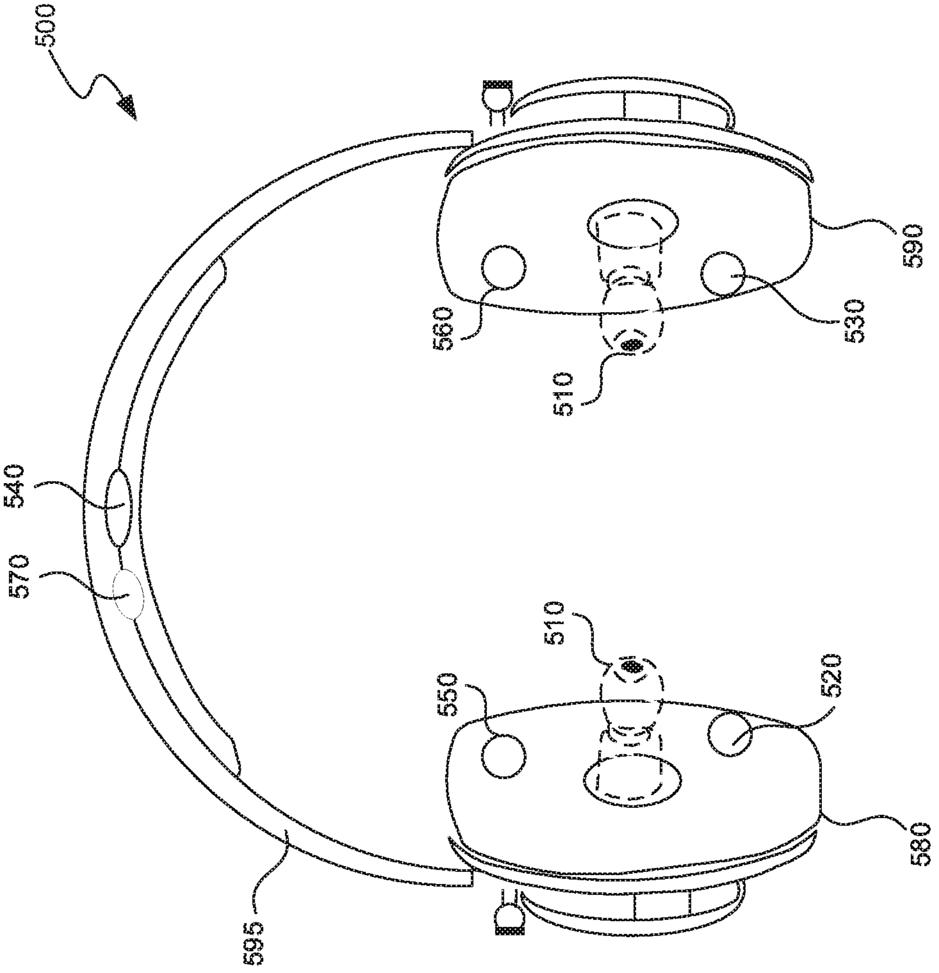
FIG. 5 shows a hearing profile measuring member, according to another embodiment.

FIG. 5 shows a hearing profile measuring member, according to another embodiment. The hearing profile measuring member 500 can be a headphone, which can include an optional one or more earbuds 510, a dry electrode 520, 530, 540, and/or a capacitive sensor 550, 560, 570.

The earbud 510 can measure OAE as described in this application. The dry electrode 520-540 and/or the capacitive sensors 550-570 can be positioned to make contact with the user's skin to measure auditory evoked potentials generated by the user in response to an auditory stimulus applied to one or both of the user's ears through the headphone 500 and/or the earbud 510. The dry electrode 520-540 and/or the capacitive sensors 550-570 can be placed within the ear cups 580, 590, and/or anywhere along the headband 595, as long as they are in contact with the user's skin.

Figure 6:
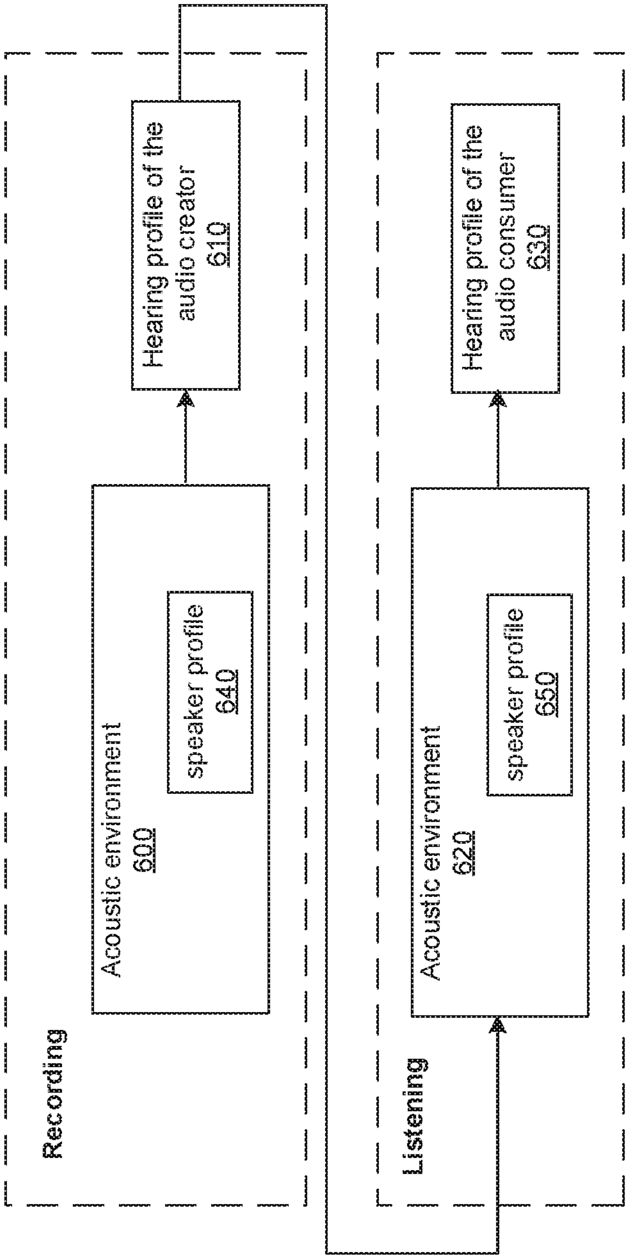
FIG. 6 shows various measurements that can be used in modifying an audible data reproduced to a user.

FIG. 6 shows various measurements that can be used in modifying an audible data reproduced to a user. The modifying member 150 in FIG. 1 can take into account one or any combination of the following measurements when modifying the audible data prior to reproducing the audible data to the user: acoustic environment 600 at the time of the audible data creation, hearing profile 610 of the audio creator, acoustic environment 620 at the time of the audible data reproduction, and/or hearing profile 630 of the audio consumer. The acoustic environment 600 and the hearing profile 610 are associated with recording an audible data, while the acoustic environment 620 and the hearing profile 630 are associated with listening to the audible data.

The acoustic environment 600 can include the acoustic profile 640 of the audio emitter, such as a speaker, playing the audio to the audio creator. The acoustic environment 620 can include the acoustic profile 650 of the audio emitter playing the audio to the audio consumer. The measurements of the hearing profile 610, 630 and the acoustic environment 600, 620 can be performed as described in this application. The modifying member 150 can modify the audible data based on one or any combination of the elements 600-650. For example, the inaudible data can contain only the acoustic profile 640. The modifying member 150 can modify the audible data based on the acoustic profile 640, and the hearing profile 630 of the audio consumer. In another example, the inaudible data can contain the acoustic environment 600 without the acoustic profile 640. The modifying member 150 can modify the audible data based on the acoustic environment 600 without the acoustic profile 640, the hearing profile 610, the acoustic environment 620, and the hearing profile 630.

Figure 7:
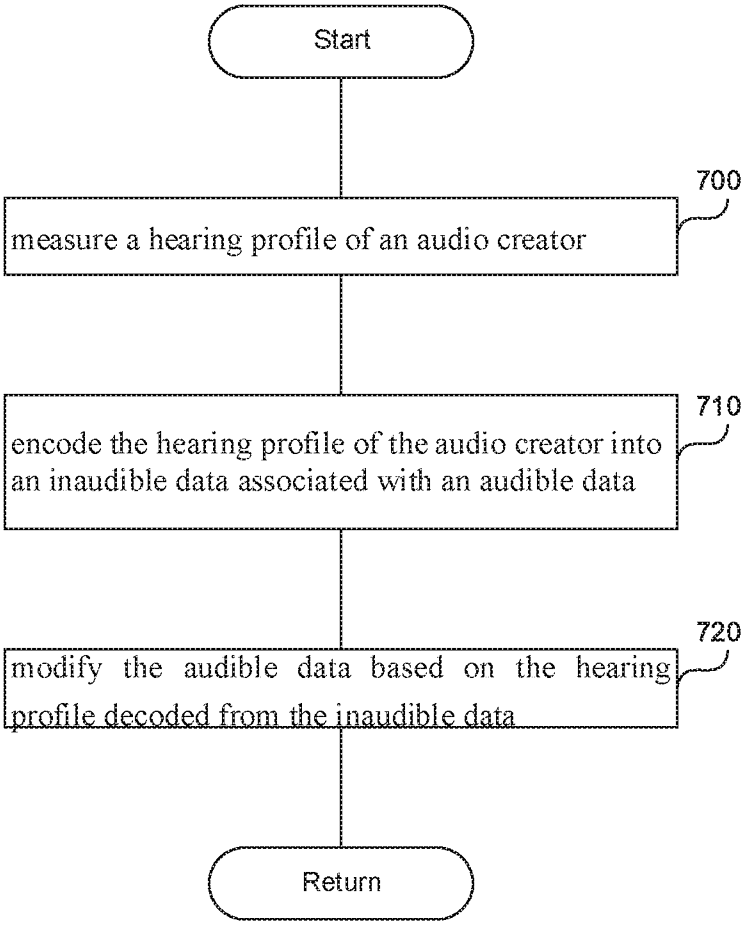
FIG. 7 is a flowchart of a method to adjust an audio signal based on the hearing profile of an audio creator.

FIG. 7 is a flowchart of a method to adjust an audio signal based on the hearing profile of an audio creator. The audio creator can be a person creating an audio, which can be shared with an audio consumer. The audio part creator can be an artist, a sound engineer, a mastering person, or anyone creating the audio.

In step 700, a processor which can be a part of a hearing profile measuring member 110 in FIG. 1, can measure a hearing profile of an audio creator. The hearing profile can correlate an amplitude and a frequency perceived by the audio creator and an amplitude and a frequency emitted by an audio emitter. The measurement of the hearing profile can be done automatically, as described in this application, without requiring a subjective measurement, i.e. an input from a user, such as the audio creator, indicating whether the user heard the sound and/or how loud is the perceived sound. The emitted frequency can be part of a test signal, or can be part of a content audio including music, speech, etc. The test signal can be embedded in the content audio.

In step 710, a processor which can be part of the encoding member 130 in FIG. 1 can encode the hearing profile of the audio creator into an inaudible data associated with an audible data. Measuring the hearing profile of the audio creator can be done at the same time as when the audible data is recorded or can be done approximately once every 10 years. The audible data can be a part of a streaming audio, streaming video, a video file, an audio file, or any other stream or a file containing audible data. The inaudible data can be metadata contained in the stream or the file containing audible data. The inaudible data can include hearing profiles of multiple audio creators, such as one or more artist, one or more audio mastering people, one or more sound engineers, etc. The inaudible data can also be embedded and/or hidden in the audible data, so that the decoding member 140 in FIG. 1 can detect and decode the data, but an audio consumer cannot hear the inaudible data.

In step 720, a processor, which can be part of the modifying member 150 in FIG. 1, can modify the audible data based on the hearing profile decoded from the inaudible data prior to playing the modified audible data to an audio consumer. To modify the audible data, the processor can adjust an amplitude of a frequency associated with the audible data in inverse relation to the hearing profile associated with the audio creator.

For example, the audio creator does not hear a frequency very well, such as, the audio creator perceives 15 kHz at 10 decibel (dB) as 15 kHz at 8 dB, i.e. the audio creator perceives 80% of the amplitude associated the 15 kHz frequency. Consequently, the audio creator listening to music in a studio can adjust, e.g. equalize, the amplitude of the 15 kHz frequency by 25% to compensate for his hearing loss. Specifically, by adjusting 8 dB by 25%, the audio creator will correctly hear 15 kHz at 10 dB. An audio consumer can have a different hearing profile from the audio creator, for example, the audio consumer can hear 15 kHz with hundred percent accuracy. The audio consumer listening to the music equalized by the audio creator can perceive the 15 kHz frequency as too loud. To prevent the hearing profile of the audio creator from affecting the listening experience of the audio consumer, the modifying member 150 upon receiving the hearing profile of the audio creator and the audio data, can adjust the 15 kHz frequency contained in the audio data to have lower amplitude to compensate for the equalization performed by the audio creator. Consequently, the audio consumer can correctly perceive the 15 kHz frequency at 10 dB.

To measure the hearing profile of the audio creator, a speaker can emit an audio signal. The hearing profile measuring member 110 can measure a response to the audio signal associated with the audio creator. To measure the response, the hearing profile measuring member 110 can measure an OAE generated in response to the audio signal. Based on the audio signal and the response to the audio signal, the hearing profile measuring member 110 can determine the hearing profile of the audio creator.

In addition to modifying the audio to account for the hearing profile of the audio creator, the modifying member 150 can modify the audible data to account for the acoustic environment surrounding the audio creator. The acoustic environment measuring member 120 can measure an acoustic environment configured to surround the audio creator to obtain a measurement of the acoustic environment. The encoding member 130 can encode the measurement of the acoustic environment configured to surround the audio creator into the inaudible data associated with an audible data. The modifying member 150 can modify the audible data based on the acoustic environment decoded from the inaudible data prior to an audio emitter 160 in FIG. 1 playing the modified audible data to an audio consumer.

The modifying member 150 can modify the audible data based on the hearing profile of the audio consumer. First, the hearing profile of the audio consumer can be measured as described in this application. For example, the hearing profile can indicate that the audio consumer receives a frequency of 1 kHz at 10 dB as the frequency of 1 kHz at 5 dB. The modifying member 150 can adjust an amplitude of a frequency associated with the audible data in proportion to the hearing profile associated with the audio consumer. In the above example, the modifying member 150 playing the audible data containing a frequency of 1 kHz, can increase the amplitude of the frequency by hundred percent so that the audio consumer perceives the frequency of 1 kHz at 10 dB as the frequency of 1 kHz at 10 dB. In other words, the modifying member modifies the audio data in inverse correlation with the hearing profile of the audio creator, and in proportion to the hearing profile of the audio consumer.

A processor can determine an acoustic profile of an audio emitter by sending a first audio signal comprising a first frequency and a first amplitude and measuring a second audio signal emitted by the audio emitter. The processor can compare the first frequency and amplitude of the first audio signal to the measured frequency and amplitude of the second audio signal and determine how the audio emitter modifies the first frequency and amplitude. The modifying member 150 can take into account the acoustic profile so measured in modifying the audible data sent to the audio emitter.

Figure 8:
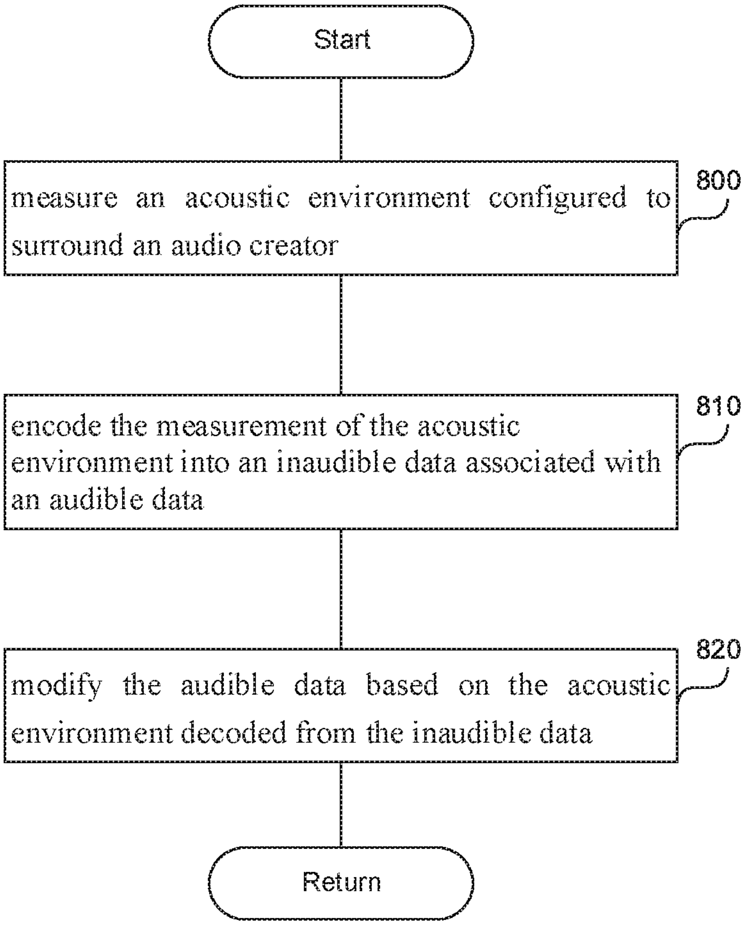
FIG. 8 is a flowchart of a method to adjust an audio signal based on an acoustic environment configured to surround an audio creator.

FIG. 8 is a flowchart of a method to adjust an audio signal based on an acoustic environment configured to surround an audio creator. In step 800, a processor which can be a part of the acoustic environment measuring member 120 in FIG. 1, can measure an acoustic environment configured to surround an audio creator to obtain a measurement of the acoustic environment. The acoustic environment can include relative locations of the audio creator and an audio emitter, an audio profile of the audio emitter, and/or impulse response within 50 cm of a location configured to accommodate the audio creator's ears. The processor can measure location of the audio emitter in relation to the location configured to accommodate the audio creator.

To obtain the audio profile of the audio emitter, the processor can receive the audio profile from the audio emitter or from a cloud computer storing the audio profile of the audio emitter. The processor can also measure an attribute of the audio emitter by sending an audio signal of a known frequency and amplitude to the audio emitter and recording with one or more microphones the audio signal played by the audio emitter.

To measure the acoustic environment, the processor can emit an audio signal through an audio emitter. The audio signal can be a test signal or content audio such as music or speech. The processor can measure an impulse response to the audio signal at a location configured to accommodate a receptor of the audio creator. The impulse response can include an amplitude of various frequencies received at the particular location. The impulse response can contain between 20 and 100 ms of sound.

In step 810, a processor can encode the measurement of the acoustic environment configured to surround the audio creator into an inaudible data associated with an audible data. The inaudible data can be a metadata associated with the audible data or can be embedded within the audible data so as to be imperceptible to a user of the audio data. The processor can send the encoded inaudible data and the audible data to a decoder, which can be associated with an audio consumer.

In step 820, a processor can modify the audible data based on the acoustic environment decoded from the inaudible data prior to playing the modified audible data to an audio consumer. To modify the sound, the processor can adjust a timing and an amplitude of the audible data based on the inaudible data to reproduce to an audio consumer the acoustic environment surrounding the audio creator.

The processor can determine an acoustic environment surrounding the audio consumer including a location of an audio consumer relative to an audio emitter. The audio emitter can be a speaker, an earbud, a headphone. The acoustic environment can contain distances between the audio consumer and the audio emitter. When the audio emitter is a speaker that is not attached to the audio consumer, the location of the user can be determined using a range finder, as described in this application, or a home device. The range finder and/or the home device can use audio, video, or a signal associated with the mobile device to locate the audio consumer.

The processor can modify the audible data based on the determined acoustic environment surrounding the audio consumer and/or the audio creator to reproduce to the audio consumer the acoustic environment configured to surround the audio creator. The acoustic environment can also include personal measurements of the audio creator and the audio consumer, such as a height, a height of the ears, and/or distance between the ears.

The processor can modify the audio data based on the hearing profile of an audio creator. The processor can measure a hearing profile of an audio creator. The hearing profile can correlate a perceived amplitude of a frequency and an emitted amplitude of the frequency the processor can encode the hearing profile of the audio creator into an inaudible data associated with an audible data. The processor can modify the audible data based on the hearing profile decoded from the inaudible data prior to playing the modified audible data to an audio consumer.

Figure 9:
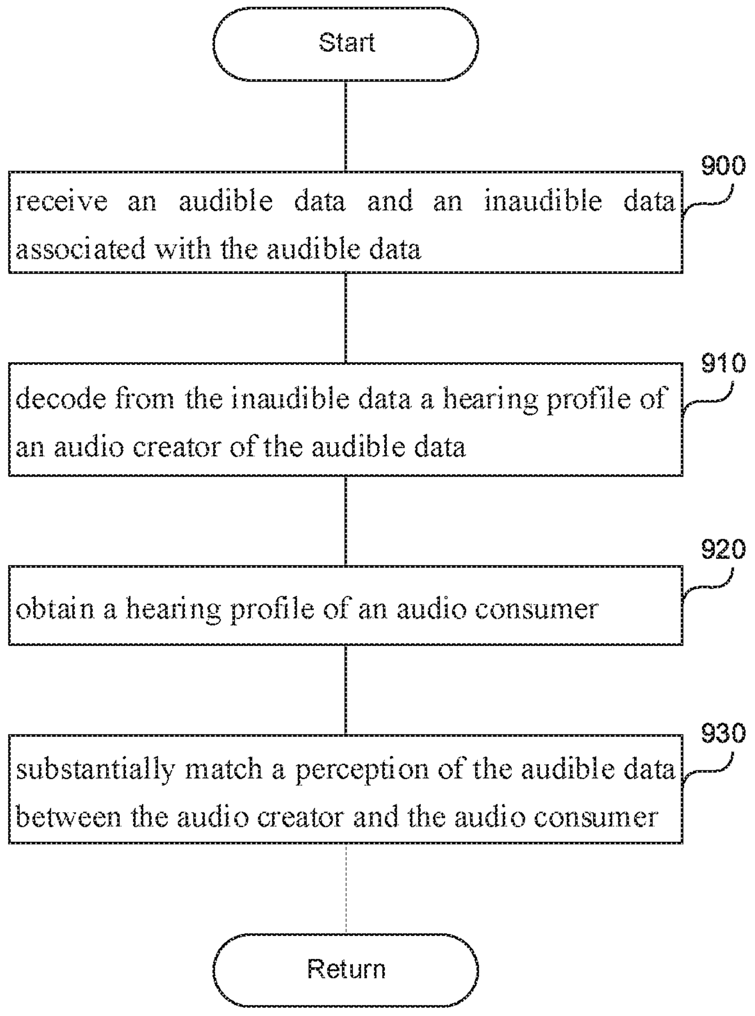
FIG. 9 is a flowchart of a method to substantially match a perception of an audio creator and perception of an audio consumer.

FIG. 9 is a flowchart of a method to substantially match a perception of an audio creator and perception of an audio consumer. In step 900, a processor can receive an audible data and an inaudible data associated with the audible data. The inaudible data can be metadata encoded along with the audible data. The inaudible data can contain the hearing profile of the audio creator and/or a measurement of an acoustic environment surrounding the audio creator.

In step 910, the processor can decode from the inaudible data the hearing profile of an audio creator of the audible data correlating an amplitude and a frequency perceived by the audio creator of the audible data and an amplitude and a frequency received by the audio creator of the audible data.

In step 920, the processor can obtain a hearing profile of the audio consumer. The hearing profile can correlate an amplitude and a frequency perceived by the audio consumer and an amplitude and a frequency received by the audio consumer. To obtain the hearing profile, the processor can measure the hearing profile of the audio consumer by, for example, measuring otoacoustic emissions generated in the audio consumer's ear, as described in this application. The processor can also obtain the hearing profile by retrieving a previously measured hearing profile from memory.

In step 930, the processor can substantially match a perception of the audible data between the audio creator and the audio consumer. To create the substantial match, the processor can modify the audible data based on the hearing profile of the audio creator and the hearing profile of the audio consumer. To perform the match, the processor can adjust an amplitude of at least a portion of the audible signal and provide the adjusted audio to the audio consumer. The amplitude of the frequency perceived by the audio consumer can be within 20% of the amplitude of the frequency perceived by the audio creator.

For example, according to the hearing profile of the audio creator, the audio creator's ear can receive a frequency at 11 kHz at 20 dB, but the audio creator can perceive that frequency as 11 kHz at 10 dB. According to the hearing profile of the audio consumer, the audio consumer can receive a frequency of 11 kHz at 20 dB but can perceive that frequency as 11 kHz at 15 dB. The amplitude of frequency at 11 kHz in the audible data can then be modified prior to being emitted to the audio consumer. To account for the hearing profile of the audio creator, the amplitude of frequency at 11 kHz is reduced, because, the audio creator, when creating the audible data, has increased the amplitude of the frequency at 11 kHz due to the audio creator's hearing loss at that frequency. To account for the hearing profile of the audio consumer and the hearing loss of the audio consumer at 11 kHz, the amplitude of the frequency at 11 kHz is increased so that the audio consumer perceives the frequency 11 kHz at the intended amplitude. The resulting amplitude of frequency 11 kHz is emitted to the audio consumer.

The processor can also decode from the inaudible data a measurement of the acoustic environment configured to surround the audio creator. The measurement of the acoustic environment of the audio creator can include distance between the audio creator and the audio emitters in the audio creator's acoustic environment, can include an impulse response measured at the location of the audio creator, and/or can include a measurement of an acoustic profile of an audio emitter part of the audio creator's acoustic environment.

The processor can measure an acoustic environment configured to surround the audio consumer. The acoustic environment of the audio consumer can include one or more audio devices. The measurement of the acoustic environment of the audio consumer can include distances between the audio consumer and each of the audio devices in the audio consumer's acoustic environment and/or an acoustic profile of one or more of the audio devices in the audio consumer's acoustic environment. Based on the measurement of the acoustic environment configured to surround the audio creator, the processor can substantially re-create the acoustic environment configured to surround the audio creator using the one or more audio devices surrounding the audio consumer.

To substantially re-create the acoustic environment of the audio creator to the audio consumer, the processor can adjust a frequency, an amplitude and/or a phase of at least a portion of the audible signal emitted through an audio device among the one or more audio devices. For example, the frequency and the amplitude adjustment can account for the varying acoustic profiles of the audio devices in the audio creator's environment and the audio devices in the audio consumer's environment. In another example, the phase and the amplitude adjustment can account for varying distances between the audio devices in the audio creator's environment and the audio consumer's environment. The substantially re-created acoustic environment of the audio consumer can match the acoustic environment of the audio creator within 40% accuracy.

Computer

Figure 10:
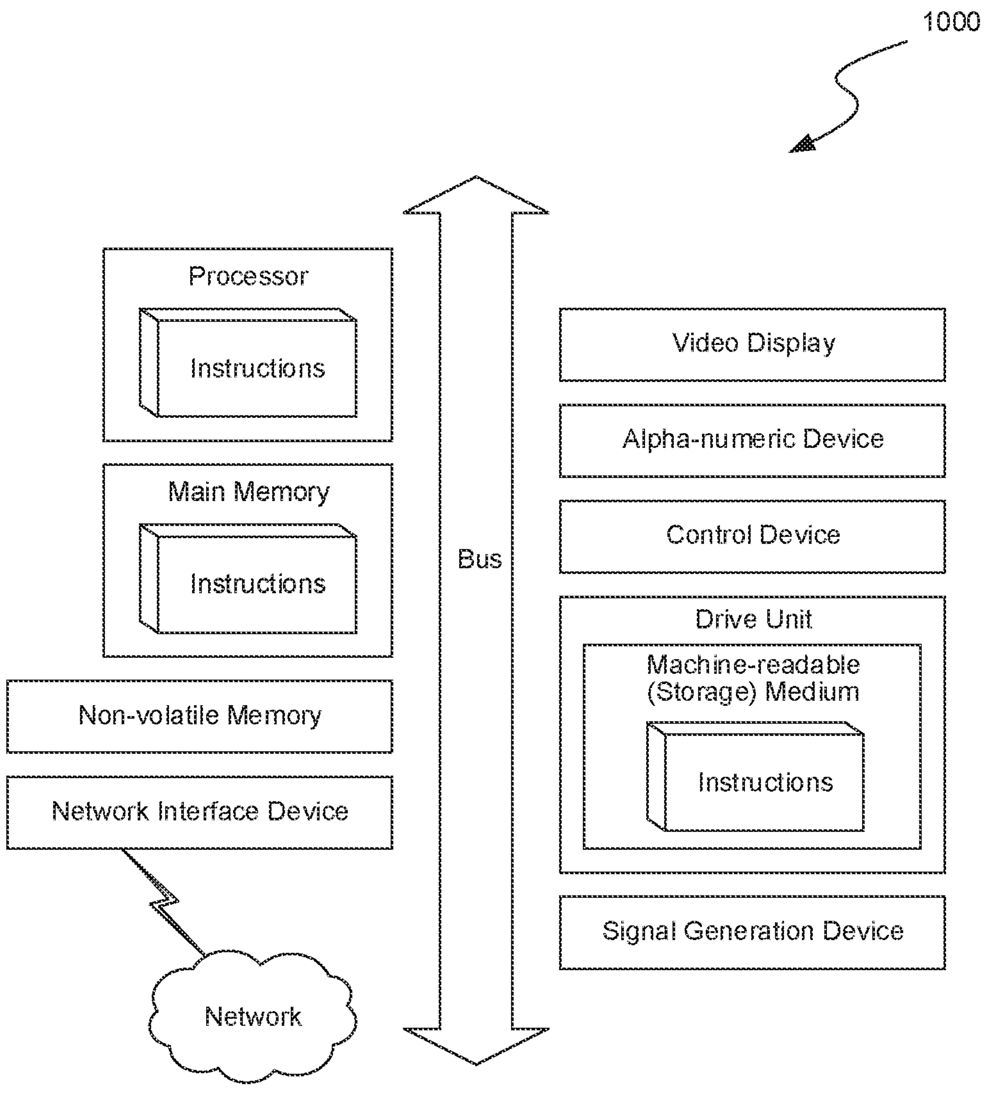
FIG. 10 is a form of a computer system within which a set of instructions, for causing the machine to perform any one or more of the methodologies or modules discussed herein, may be executed.

FIG. 10 is a form of a computer system 1000 within which a set of instructions, for causing the machine to perform any one or more of the methodologies or modules discussed herein, may be executed.

In the example of FIG. 10, the computer system 1000 includes a processor, memory, non-volatile memory, and an interface device. Various common components (e.g., cache memory) are omitted for illustrative simplicity. The computer system 1000 is intended to illustrate a hardware device on which any of the components described in the example of FIGS. 1-9 (and any other components described in this specification) can be implemented. The computer system 1000 can be of any applicable known or convenient type. The components of the computer system 1000 can be coupled together via a bus or through some other known or convenient device.

The processor of the computer system 1000 can be used to execute any of the instructions described in FIGS. 7-8. The processor can be all, or a part of a hearing profile measuring member 110, an acoustic environment measuring member 120, an encoding member 130, a decoding member 140, a modifying member 150, and/or an audio emitter 160 in FIG. 1. The drive unit, the main memory, and/or the nonvolatile memory of computer system 1000 can be used to store the audible data and the inaudible data, as described in this application. Various devices described in this application such as hearing profile measuring member 110, the acoustic environment measuring member 120, the encoding member 130, the decoding member 140, the modifying member 150, the audio emitter 160, the range finder 370 in FIG. 3, the home device 380 in FIG. 3, etc. can communicate with each other using the network interface device of the computer system 1000.

This disclosure contemplates the computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1000. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method comprising:

receiving an audible data and an inaudible data associated with the audible data, wherein the audible and inaudible data is received from a headphone system including a headband, earcups connected with the headband, and earbuds included within the earcups;

decoding, from the inaudible data, a hearing profile of an audio creator, wherein the hearing profile of the audio creator is generated based on a measured otoacoustic emission at a same location automatically where the audible data was created by the audio creator;

identifying one or more hearing impairment of the audio creator from the hearing profile of the audio creator;

measuring an acoustic environment of the audio creator based on a height of the audio creator;

modifying the audible data based on the hearing profile and the acoustic environment of the audio creator to adjust for the identified one or more hearing impairment of the audio creator; and providing the modified audible data to an audio consumer, such that the audio consumer perceives a consumer audio experience substantially similar to a creator audio experience of the audio creator, wherein the modified audible data prevents the one or more hearing impairment of the audio creator from affecting the consumer audio experience.

2. The method of claim 1, further comprising determining an acoustic environment of the audio consumer, wherein audible data is further modified based on the acoustic environment of the audio consumer.

3. The method of claim 2, wherein measuring the acoustic environment of the audio consumer further comprises:

measuring a distance between at least one audio device proximate to the audio consumer and the audio consumer.

4. The method of claim 2, further comprises:

measuring an acoustic profile of at least one audio device proximate to the audio consumer;

continuously monitoring an ambient noise surrounding the audio consumer; and adjusting an amplitude of the audible data to mask the ambient noise.

5. The method of claim 4, further comprising:

adjusting a frequency, an amplitude, or a phase of a portion of the audible data emitted through the at least one audio device.

6. The method of claim 2, further comprising:

determining an acoustic profile of an audio emitter by sending a first audio signal, measuring a second audio signal emitted by the audio emitter, and comparing the first audio signal and the second audio signal.

7. The method of claim 1, wherein modifying the audible data further comprises:

adjusting an amplitude of at least a portion of the audible data prior to providing at least the portion of the audible data to the audio consumer.

8. The method of claim 1, further comprising obtaining an hearing profile of the audio consumer by:

emitting an audio signal;

measuring a response to the audio signal associated with the audio consumer;

measuring an otoacoustic emission generated in response to the audio signal; and creating the hearing profile of the audio consumer based on the measured otoacoustic emission.

9. The method of claim 1, wherein measuring the acoustic environment of the audio creator is further based on at least one personal measurement of the audio creator including a height of ears, or a distance between the ears.

10. The method of claim 1, wherein modifying the audible data further comprises:

adjusting an amplitude or a frequency associated with the audible data in inverse relation to the hearing profile of the audio creator.

11. The method of claim 1, wherein modifying the audible data further comprises:

adjusting an amplitude or a frequency associated with the audible data in proportion to the hearing profile of the audio consumer.

12. A system for enabling audio consumers to perceive audible data based on how audio producers perceive audible data, the system comprising one or more hardware processors configured to:

receive a hearing profile of an audio creator, wherein the hearing profile is based on an objective measurement from an otoacoustic emission;

receive audible data corresponding to a content created by the audio creator, wherein a listening experience of the content was adjusted by the audio creator, wherein the objective measurement from the otoacoustic emission is performed at a same location automatically where the content was created by the audio creator, wherein the hearing profile is received from earbuds embedded within earcups of a headphone system including a headband that connects the earcups;

measure an acoustic environment of the audio creator based on a height of the audio creator;

identify one or more hearing impairment of the audio creator from the hearing profile of the audio creator; and adjust the received audible data based on the identified one or more hearing impairment and the acoustic environment, thereby preventing the listening experience of the content to be affected by the one or more hearing impairment.

13. The system of claim 12, wherein the one or more hardware processors are further configured to adjust the audible data based on a hearing profile of an audio consumer.

14. The system of claim 12, wherein the adjustment comprises lowering an amplitude at a frequency corresponding to the one or more hearing impairment.

15. The system of claim 12, further comprising an earbud including at least two microphones and two speakers, wherein the earbud is configured to conduct the objective measurement using the otoacoustic emission.

16. The system of claim 12, wherein the one or more hearing impairment can be across a plurality of frequencies.

* * * * *